(12) United States Patent
Ralvert

(10) Patent No.: US 10,005,213 B2
(45) Date of Patent: Jun. 26, 2018

(54) METHOD FOR MAKING A FILTER SEGMENT FOR A DISC FILTER

(71) Applicant: Veolia Water Solutions & Technologies Support, Saint-Maurice (FR)

(72) Inventor: Ake Ralvert, Hasslehlom (SE)

(73) Assignee: Veolia Water Solutions & Technologies Support, Saint-Maurice (FR)

(*) Notice: Subject to any disclaimer, the term of this patent is extended or adjusted under 35 U.S.C. 154(b) by 328 days.

(21) Appl. No.: 15/071,705

(22) Filed: Mar. 16, 2016

(65) Prior Publication Data

US 2016/0193767 A1 Jul. 7, 2016

Related U.S. Application Data

(62) Division of application No. 13/820,317, filed as application No. PCT/SE2011/051035 on Aug. 30, 2011.

(30) Foreign Application Priority Data

Sep. 2, 2010 (SE) .................................. 1050901

(51) Int. Cl.

| B29C 45/16 | (2006.01) |
|---|---|
| B01D 33/23 | (2006.01) |
| B29C 45/14 | (2006.01) |
| B29C 45/00 | (2006.01) |
| B29C 55/02 | (2006.01) |

(Continued)

(52) U.S. Cl.
CPC .......... *B29C 45/1671* (2013.01); *B01D 33/23* (2013.01); *B29C 45/0001* (2013.01); *B29C 45/14262* (2013.01); *B29C 45/14336* (2013.01); *B29C 55/02* (2013.01); *B29C 2045/1681* (2013.01); *B29K 2023/12* (2013.01); *B29K 2067/00* (2013.01); *B29K 2105/0809* (2013.01); *B29K 2105/12* (2013.01); *B29K 2309/08* (2013.01); *B29K 2667/00* (2013.01); *B29L 2031/14* (2013.01)

(58) Field of Classification Search
None
See application file for complete search history.

(56) References Cited

U.S. PATENT DOCUMENTS 4,113,627 A * 9/1978 Leason ............... B01D 19/0031
210/446
4,130,622 A * 12/1978 Pawlak .................. B01D 29/111
264/255

(Continued)

FOREIGN PATENT DOCUMENTS

| EP | 0963261 B1 | 4/2003 |
|---|---|---|
| EP | 1872843 A1 | 1/2008 |

(Continued)

*Primary Examiner* — Edmund H Lee
(74) *Attorney, Agent, or Firm* — Coats & Bennett, PLLC

(57) ABSTRACT

A disc filter disposed around a drum for filtering water. The disc filter includes a frame structure and a plurality of filter segments arranged around the drum and secured to the support. Each filter segment includes a filter frame having first and second portions and filter material integrated with the first and second portions of the filter frame through an injection moulding process.

15 Claims, 2 Drawing Sheets

(51) Int. Cl.
    *B29K 23/00*      (2006.01)
    *B29K 67/00*      (2006.01)
    *B29K 105/08*     (2006.01)
    *B29K 105/12*     (2006.01)
    *B29K 309/08*     (2006.01)
    *B29K 667/00*     (2006.01)
    *B29L 31/14*      (2006.01)

(56) References Cited

U.S. PATENT DOCUMENTS

| | | | | |
|---|---|---|---|---|
| 4,414,172 A | * | 11/1983 | Leason | B01D 29/012 210/445 |
| 4,861,462 A | | 8/1989 | Lehmann et al. | |
| 4,950,403 A | | 8/1990 | Hauff | |
| 5,527,500 A | * | 6/1996 | Specht | B29C 45/14336 264/252 |
| 5,885,499 A | * | 3/1999 | Aksberg | B01D 29/012 264/153 |
| 6,328,548 B1 | * | 12/2001 | Salas | B29C 45/14008 264/252 |
| 6,981,860 B2 | * | 1/2006 | Takemoto | B29C 45/0062 425/116 |
| 7,314,556 B2 | | 1/2008 | Sheets et al. | |
| 2005/0280178 A1 | * | 12/2005 | Stankowski | B01D 29/012 264/252 |
| 2009/0020484 A1 | | 1/2009 | Davis et al. | |
| 2010/0245474 A1 | * | 9/2010 | Okubo | B29C 70/80 347/44 |

FOREIGN PATENT DOCUMENTS

| | | |
|---|---|---|
| EP | 2221100 A1 | 8/2010 |
| GB | 1195955 | 6/1970 |
| JP | S55115321 UA | 8/1980 |
| JP | 2004345195 A | 12/2004 |
| WO | 9521677 | 8/1995 |
| WO | 03/095113 A1 | 11/2003 |
| WO | 2008/021270 A2 | 2/2008 |

* cited by examiner

METHOD FOR MAKING A FILTER SEGMENT FOR A DISC FILTER

RELATED APPLICATIONS

The present application is a divisional application of U.S. patent application Ser. No. 13/820,317 which was filed on May 10, 2013, which application is a U.S. National Stage Application of PCT Application No. PCT/SE2011/051035, with an international filing date of Aug. 30, 2011. Applicant claims priority based on Swedish Patent Application No. SE 1050901-6 filed Sep. 2, 2010. The subject matter of these applications is incorporated herein in their entirety.

TECHNICAL FIELD OF THE INVENTION

The present invention relates to a method and a device for making a disc-shaped filter segment for a disc filter, said filter segment comprising a filter frame and a filter material, said filter frame being adapted for a filter support of the disc filter.

BACKGROUND ART

A filter frame for a disc filter is previously known through EP-1 872 843. The filter frame consists of a cast aluminium frame and a filter material attached thereto by gluing. The filter material may be a cloth of metal, textile, or plastic material, which is mounted on the frame and pre-tensioned by hanging weights around the cloth before it is glued to the frame. Filter frames of stainless steel or pre-tensioned glass fibre have also previously been used, and have then been constructed from prefabricated profiles, which are joined together to form a filter frame. Even though filter frames made of aluminium have reduced the number of working operations as compared to constructing frames from prefabricated profiles, the problem remains that a large amount of filter material is consumed when pre-tensioning the cloth, and additionally, the machining of the frame and gluing of the cloth have been very time consuming.

SUMMARY OF THE INVENTION

An object of the present invention is to make a filter frame, which is suitable for mass production with fewer and shorter working operations for completing mounting of filter material in the filter frame.

According to an embodiment of the invention, these and other objects are achieved by a method for making a disc-shaped filter segment for a disc filter, which filter segment comprises a filter frame and a filter material, said filter frame being adapted for a filter support of the disc filter, characterised by an injection moulding of the filter frame in a lower half and an upper half with a filter material placed between the lower half and the upper half, said filter material being stretched and during injection moulding in stretched condition being integrated in the lower half and the upper half of the filter frame, and wherein the filter material after injection moulding exhibits a residual stretching in the material. In this manner, the filter frame is produced with the filter material in place. Hence, subsequent mounting and gluing are no longer necessary.

Suitably, the lower half of the filter fame is injection moulded in a first step, subsequently the filter material is placed against the lower half and stretched, and the upper half of the filter frame is injection moulded in a second step, wherein in the second step the filter material is integrated in the lower half and the upper half of the filter frame. By injection moulding in two steps, a satisfactory quality of the filter segment is ensured.

Suitably, after injection moulding, the filter material exhibits a residual stretching of the material which is more than 2 N/cm. This residual stretching in the material is sufficient to withstand the applicable loads on disc filters for water treatment.

In a preferred embodiment, the filter frame exhibits a generally elongated shape, wherein at least one reinforcement beam extends between the long sides of the filter frame, said reinforcement beam by injection moulding being integrated in the filter cloth. The reinforcement beam increases the stability and permits a higher load on the filter segment.

The invention also relates to a filter segment for a disc filter, which comprises a filter frame and a filter material, said filter frame being adapted for a filter support of the disc filter, characterised by an injection moulded filter frame with a filter material integrated in stretched condition between a lower half of the filter frame and an upper half of the filter frame, said filter material after injection moulding exhibiting a residual stretching of the material. By integrating the filter material in stretched condition, a finished product is achieved, which exhibits little bulging of the filter material when loaded.

Suitably, the filter frame consists of glass fibre reinforced polypropylene. This material is suitable for injection moulding and enables a low weight of the filter frame.

Preferably, the filter material includes polyester. A filter cloth of polyester exhibits a sufficient strength, may be manufactured with suitable filter properties, and is possible to integrate in the material of the filter frame.

BRIEF DESCRIPTION OF THE DRAWINGS

The invention will be described in more detail with reference to the appended schematic drawings, which by way of example show presently preferred embodiments of the invention.

DETAILED DESCRIPTION OF PREFERRED EMBODIMENTS OF THE INVENTION

Figure 1A:
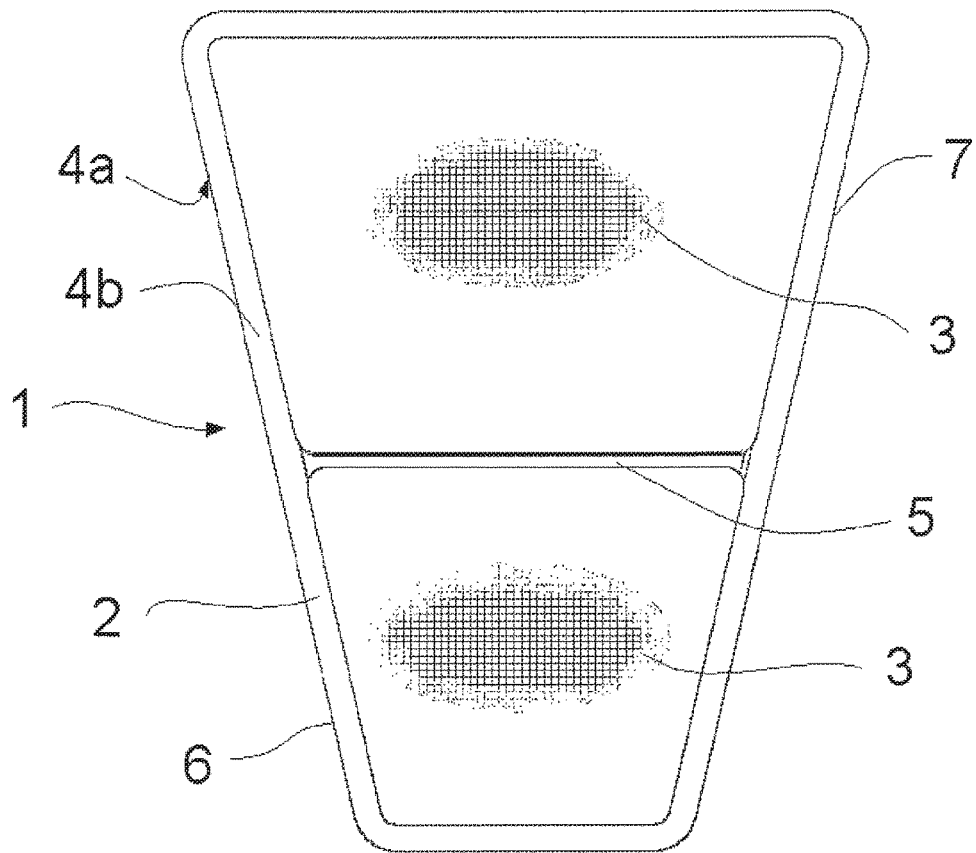
FIGS. 1a and 1b are sketches that schematically show a filter segment for a disc filter according to the invention in a top view and a side view, respectively.
Figure 1B:
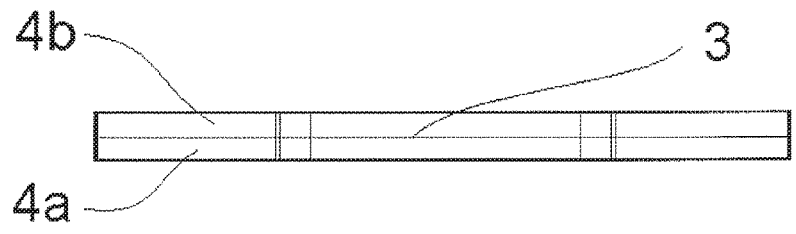

In FIGS. 1a and 1b a disc-shaped filter segment 1 or plastic panel for use in an existing disc filter (not shown) comprising a filter frame 2 designed to fit in a holder (not shown) of the disc filter is shown. The filter frame 2 has a generally elongated shape and is here shown as an upside-down frustum of a cone, which is intended to extend radially over a significant part of a filter element (not shown) of a disc filter. The filter frame 2 suitably consists of glass fibre reinforced polypropylene or other plastic material with similar properties, and has been injection moulded with a filter material 3 in stretched condition arranged integrated in a plane between a lower half 4a of the filter frame 2 and an upper half 4b of the filter frame 2. The filter material 3 includes a polyester cloth, but may of course be made of other plastic material or metal. The integration of the filter material 3 implies that the plastic of the filter frame 2 during injection moulding penetrates the cloth and fixes this to the filter frame 2, while at the same time the cloth forms a reinforcement of the filter frame 2. The stretching of the filter material 3 may be achieved in various ways, such as fixing the cloth just outside the mould used for injection moulding the filter frame 2, and subsequently extending the fixed cloth, or by using a heated cloth that shrinks when the filter segment 1 cools after the injection moulding. Thus, after injection moulding, the filter material 3 exhibits a residual stretching of the material, which is more than 2 N/cm, and preferably more than 4 N/cm. In order that the filter frame 2 should not bulge inwardly when loaded, a reinforcement beam 5 extends between the long sides 6 and 7 of the filter frame. Such a pretensioning of the filter material 3 is important, since it is subjected to higher pressures, e.g., during water treatment in a disc filter as compared to similar filters used for cleaning air.

The reinforcement beam 5 is by the injection moulding integrated in the filter material 3, and suitably extends on both sides of the filter material 3. The residual stretching of the filter material 3 leads to reduced bulging of the cloth when loaded as compared to a traditionally glued cloth. The reinforcement beams 5 will also contribute to reducing the bulging of the cloth. With reduced bulging follows a longer working life of the cloth, since the fatigue wear is reduced, and at the same time a reduced bulging is necessary for allowing shorter construction length of the disc filter.

Figure 2:
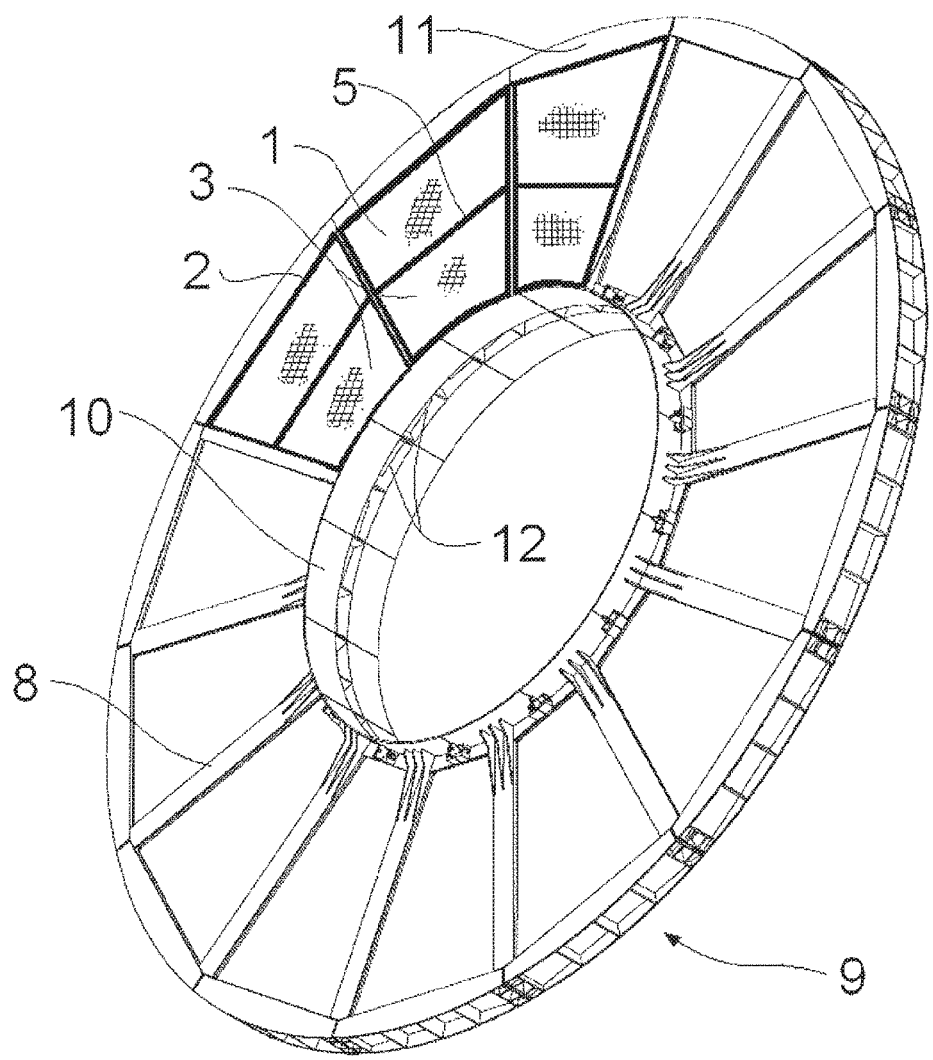
FIG. 2 is a schematic perspective view of a disc shaped filter element with three filter segments according to FIG. 1.

As may be seen in FIG. 2, the filter segment 1 is intended to be slid into said holder or in other manner be releasably attached on each side of a filter support 8 of a disc filter 9. In FIG. 2, three filter segments 1 are shown arranged in the filter support 8. A plurality of disc-shaped filter segments 1 are arranged around a central drum 10 of the disc filter 9 to form a generally circular disc-shaped filter segment 11 on each side of the filter support 8. The disc-shaped filter element 11 in FIG. 2 has fourteen positions for the filter segments 1, but naturally, the number of positions may vary depending on the size of the disc filter 9. Liquid intended to be cleaned thus flows through openings 12 in the central drum 10, and out through two filter elements 11 arranged about the filter support 8, to then pass through the filter material 3 in the respective filter segment 1, possible pollutants being intended to be caught in the cloth.

The invention claimed is:

1. A method for making a filter segment for a disc filter, comprising:
   injection moulding filter material into a filter frame to form an integrated filter frame and filter material by:
   i. injection moulding a first portion of the filter frame in a first injection moulding process;
   ii. stretching the filter material over the first portion of the filter frame produced in the first injection moulding process; and
   iii. subjecting the first portion of the filter frame and the stretched filter material to a second injection moulding process where the second injection moulding process: (1) forms a second portion of the filter frame; and (2) integrates the filter material into the first and second portions of the filter frame.

2. The method of claim 1 wherein after the second injection moulding process, the filter material exhibits a residual stretching of the material.

3. The method of claim 2 wherein the residual stretching is more than 2 N/cm.

4. The method of claim 1 wherein the filter frame includes an outer parameter that extends around the filter material and wherein the method further provides a transverse beam that extends between opposite portions of the outer perimeter and wherein the second injection moulding process integrates the filter material with the transverse beam.

5. The method of claim 1 wherein the filter frame includes first and second half sections and wherein the second injection moulding process sandwiches the filter material between the first and second half sections of the filter frame.

6. The method of claim 1 wherein the filter frame is constructed of plastic material and the method includes penetrating the filter material with the plastic material of the filter frame and fixing the filter material to the filter frame.

7. The method of claim 1 wherein stretching the filter material over the first portion of the filter frame produced in the first injection moulding process includes using a heated filter material and after the second injection moulding process, shrinking the filter material by cooling the filter segment.

8. The method of claim 1 wherein stretching the filter material over the first portion of the filter frame produced in the first injection moulding process comprises heating the filter material in the second injection moulding process and after the second injection moulding process, cooling the filter segment and causing the filter material to shrink.

9. The method of claim 7 including reinforcing the filter frame by integrating the filter material into the first and second portions of the filter frame.

10. A method of making a filter segment for a disc filter employing an injection moulding process that includes first and second sequential injection moulding processes, the method comprising:
    forming a filter frame by injection moulding a first portion of the filter frame in the first injection moulding process;
    after forming the first portion of the filter frame, stretching a filter material over the first portion of the filter frame produced in the first injection moulding process;
    after the first injection moulding process, subjecting the first portion of the filter frame and the stretched filter material to the second injection moulding process which forms a second portion of the filter frame and which sandwiches the filter material between the first and second portions of the filter frame and integrates the filter material into the first and second portions of the filter frame such that the filter material reinforces the filter frame; and
    heating the filter material and after the second injection moulding process, cooling the filter segment and causing the filter material to shrink.

11. The method of claim 10 further including forming the first and second portions of the filter frame with glass fiber reinforced polypropylene and causing the glass fiber reinforced polypropylene to penetrate the filter material and fix the filter material to the glass fiber reinforced polypropylene.

12. The method of claim 11 wherein after the second injection moulding process, the shrinking of the filter material causes a residual stretching of the filter material which exceeds 2 N/cm.

13. A method of making a filter segment for a disc filter employing an injection moulding process that includes first and second sequential injection moulding processes, the method comprising:
    forming a filter frame by injection moulding a first portion of the filter frame in the first injection moulding process;
    after forming the first portion of the filter frame, stretching a filter material over the first portion of the filter frame produced in the first injection moulding process;

after the first injection moulding process, subjecting the first portion of the filter frame and the stretched filter material to the second injection moulding process which forms a second portion of the filter frame and which sandwiches the filter material between the first and second portions of the filter frame and integrates the filter material into the first and second portions of the filter frame such that the filter material reinforces the filter frame; and residually stretching the filter material after the second injection moulding process and after the filter material has been integrated into the first and second portions of the filter frame.

14. The method of claim 13 including residually stretching the filter material to more than 2 N/cm.

15. The method of claim 14 further including forming the first and second portions of the filter frame with glass fiber reinforced polypropylene and causing the glass fiber reinforced polypropylene to penetrate the filter material and affix the filter material to the glass fiber reinforced polypropylene.

* * * * *